United States Patent
Ashibe et al.

(10) Patent No.: US 7,849,704 B2
(45) Date of Patent: Dec. 14, 2010

(54) CRYOGENIC APPARATUS OF SUPERCONDUCTING EQUIPMENT

(75) Inventors: Yuuichi Ashibe, Osaka (JP); Hideki Itoh, Tokyo (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 396 days.

(21) Appl. No.: 11/794,803

(22) PCT Filed: Nov. 15, 2005

(86) PCT No.: PCT/JP2005/020906

§ 371 (c)(1),
(2), (4) Date: Jul. 6, 2007

(87) PCT Pub. No.: WO2006/075443

PCT Pub. Date: Jul. 20, 2006

(65) Prior Publication Data

US 2008/0119362 A1    May 22, 2008

(30) Foreign Application Priority Data

Jan. 12, 2005    (JP) .............................. 2005-005778

(51) Int. Cl.
*F25D 23/12* (2006.01)
*F17C 3/08* (2006.01)

(52) U.S. Cl. ...................................... 62/259.2; 62/45.1

(58) Field of Classification Search .................. 62/51.1, 62/259.2; 174/15.5, 125.1; 505/220, 230
See application file for complete search history.

(56) References Cited

U.S. PATENT DOCUMENTS

| 2,864,527 | A | * | 12/1958 | Altman et al. | .......... | 220/560.12 |
| 2003/0154727 | A1 | * | 8/2003 | Ashibe et al. | ................ | 62/45.1 |
| 2004/0256126 | A1 | * | 12/2004 | Ashibe et al. | .............. | 174/15.5 |

FOREIGN PATENT DOCUMENTS

| JP | 80574/1977 | | 1/1979 |
| JP | 2002-238144 | | 8/2002 |
| JP | 2002280628 A | * | 9/2002 |
| JP | 2005-117724 | | 4/2005 |
| WO | 02/065605 | | 8/2002 |

* cited by examiner

*Primary Examiner*—Frantz F. Jules
*Assistant Examiner*—Emmanuel Duke
(74) *Attorney, Agent, or Firm*—Drinker Biddle & Reath LLP

(57) ABSTRACT

A cryogenic apparatus of superconducting equipment with excellent assembly workability and a termination structure of a superconducting cable including the cryogenic apparatus are provided. A termination structure of a superconducting cable includes a terminal of the superconducting cable disposed on a low-temperature side, a bushing 10 for communicating power between the low-temperature side and a room-temperature side, a connection part 2 connecting the terminal of the cable and the bushing 10, and a terminal connection box 3 accommodating the connection part 2. The terminal connection box 3 includes a coolant vessel 20 accommodating a terminal of the bushing 10 on the low-temperature side and the connection part 2 and filled with a coolant for cooling the terminal and the connection part 2 and a vacuumed vessel 30 disposed so as to surround the coolant vessel 20. The vacuumed vessel 30 includes a first vacuum part 31 where a vacuum can be maintained irrespective of the presence or absence of the bushing 10.

14 Claims, 5 Drawing Sheets

ROOM-TEMPERATURE SIDE

SUPERCONDUCTING CABLE →

CRYOGENIC APPARATUS OF SUPERCONDUCTING EQUIPMENT

TECHNICAL FIELD

The present invention relates to a cryogenic apparatus of superconducting equipment for accommodating a bushing for communicating power between a low-temperature side and a room-temperature side, and also relates to a termination structure of a superconducting cable including the cryogenic apparatus. In particular, the present invention relates to a cryogenic apparatus of superconducting equipment with excellent assembly workability.

BACKGROUND ART

FIG. 5 shows an example of a known termination structure of a superconducting cable (see Patent Document 1). This termination structure is connected to a cable core 100 drawn from a terminal of a superconducting cable to communicate power between a low-temperature side and a room-temperature side. Specifically, the termination structure includes a superconductor 100a exposed from the core 100, a bushing 101 for providing electrical connection between the superconductor 100a and a conductor (not shown) disposed on the room-temperature side, a coolant vessel 102 accommodating a terminal of the bushing 101 on the low-temperature side and a connection part 110 connecting the superconductor 100a and the bushing, a vacuumed vessel 103 disposed so as to surround the coolant vessel 102, and a porcelain tube 104 protruding from the room-temperature side of the vacuumed vessel 103.

The bushing 101 includes a central conductive part 101a electrically connected to the superconductor 100a via the connection part 110 and a solid-state insulating layer 101b covering the conductive part 101a and formed of FRP. The bushing 101 is accommodated in the coolant vessel 102 and the porcelain tube 104. In this example, the superconductor 100a is connected to a connection conductor 120 formed of a normal conductor material such as copper. The connection conductor 120 is connected to the conductive part 101a of the bushing 101 via the connection part 110. The bushing 101 has flanges 101c and 101d around the periphery thereof. The bushing 101 is fixed to the coolant vessel 102 with the flange 101c and to the vacuumed vessel 103 with the flange 101d.

The coolant vessel 102 is filled with a liquid coolant, such as liquid nitrogen, to cool the bushing 101, the connection part 110, and the connection conductor 120. The vacuumed vessel 103 includes a cylindrical intermediate vacuum part 103a connecting the coolant vessel 102 on the low-temperature side and the porcelain tube 104 on the room-temperature side. The bushing 101 is inserted into the intermediate vacuum part 103a to reduce heat penetration from the room-temperature side to the low-temperature side. That is, part of the vacuumed vessel 103 has a double structure including both the intermediate vacuum part 103a and an outer vacuum part 103b. The porcelain tube 104 is filled with an insulation fluid such as insulation oil or $SF_6$ gas.

Patent Document 1: Japanese Unexamined Patent Application Publication No. 2002-238144

DISCLOSURE OF INVENTION

Problems to be Solved by the Invention

However, the above known termination structure is time-consuming to assemble, and improved workability has been demanded. In particular, a reduction in workload at installation sites has been demanded.

A termination structure is conventionally assembled by the following process: connecting a superconductor and a bushing; assembling a coolant vessel; assembling a vacuumed vessel; fixing the bushing to the coolant vessel and the vacuumed vessel; and evacuating the vacuumed vessel. For the known termination structure described above, the vacuumed vessel cannot be evacuated before the bushing is fixed to the coolant vessel and the vacuumed vessel, because some components of the bushing (the flanges 101c and 101d in the example of FIG. 5) constitute part of the coolant vessel and the vacuumed vessel. In addition, the vacuumed vessel requires excellent thermal insulation, that is, a high degree of vacuum, because a coolant such as liquid nitrogen for use in superconducting equipment, including a superconducting cable, has extremely low temperature (77 K for liquid nitrogen). Furthermore, a thermal insulation such as Super Insulation (registered trademark) is generally provided in the vacuumed vessel to enhance insulation. When the termination structure is assembled at an installation site, the thermal insulation can absorb, for example, moisture through exposure to air before evacuation. Accordingly, it takes a considerable amount of time to evacuate the vacuumed vessel to a high degree of vacuum.

Baking is effective in reducing evacuation time. In baking, an object is heated to evaporate, for example, moisture contained therein. The above termination structure, however, is relatively large and requires correspondingly large baking equipment (including a heater and a power supply). Such baking equipment is difficult to transport to an installation site. In addition, because the superconducting cable and the bushing are connected before baking, heating at extremely elevated baking temperature can damage the components of the termination structure, particularly, an electrically insulating layer of the superconducting cable. To prevent the damage to the components such as the electrical insulating layer, the baking must be performed at relatively low temperature (for example, about 70° C.). Such baking does not relieve the problem of time-consuming evacuation.

Furthermore, backup components are required for evacuation at an installation site in case of an accident such as vacuum leakage. This increases the number of components to be transported to the installation site.

Evacuation after attachment of a bushing to coolant and vacuumed vessels is performed not only in the installation of termination structures of superconducting cables, but also in the installation of superconducting equipment as used for installation of superconducting cable lines, including superconducting transformers, superconducting fault current limiters (FCL), and superconducting power storage equipment. Improved assembly workability has also been demanded for such equipment.

Accordingly, a main object of the present invention is to provide a cryogenic apparatus of superconducting equipment with excellent assembly workability and a termination structure of a superconducting cable including the cryogenic apparatus. Another object of the present invention is to provide a cryogenic apparatus of superconducting equipment which can easily be transported to an installation site.

Means for Solving the Problems

According to the present invention, the above objects are achieved by providing a vacuum part where a vacuum can be maintained irrespective of the presence or absence of a bushing. That is, the present invention provides a cryogenic apparatus of superconducting equipment for accommodating a connection part connecting a terminal of a superconducting part disposed on a low-temperature side and a bushing connected to the superconducting part for communicating power between the low-temperature side and a room-temperature side. This cryogenic apparatus includes a coolant vessel accommodating a terminal of the bushing on the low-temperature side and the connection part and filled with a coolant for cooling the terminal and the connection part and a vacuumed vessel disposed so as to surround the coolant vessel. The cryogenic apparatus according to the present invention is primarily characterized in that the vacuumed vessel includes a first vacuum part where a vacuum can be maintained irrespective of the presence or absence of the bushing.

The vacuum part of the cryogenic apparatus according to the present invention can be evacuated irrespective of the presence or absence of the bushing because the components of the bushing do not constitute part of the coolant vessel or the vacuumed vessel. Hence, at least the vacuum part can be evacuated in, for example, a factory in advance to reduce workload at an installation site, particularly, evacuation time. In particular, the workload at the installation site can be further reduced by maximizing the volume of the vacuum part to further improve assembly workability. The effect of improved assembly workability is significant for superconducting cables because they use a relatively large cryogenic apparatus.

As described above, assembly operation at an installation site, particularly evacuation, is time-consuming for a known termination structure of a superconducting cable in which the components of a bushing constitute part of a coolant vessel and a vacuumed vessel. Although the time for evacuation can be reduced to some extent by baking, a considerable effort must be expended to transport baking equipment. It is possible to assemble the coolant vessel and the vacuumed vessel in a factory in advance before the assembly is transported to the installation site, rather than to assemble them at the installation site. However, the known termination structure is evacuated with the bushing fixed to the coolant vessel and the vacuumed vessel. The transportation of the termination structure may be difficult due to height limitation because a terminal of the bushing on the room-temperature side protrudes. In particular, the known termination structure becomes more bulky after a porcelain tube is provided around the protruding terminal. In contrast, the vacuum part of the cryogenic apparatus according to the present invention can be evacuated without fixing the bushing to the coolant vessel or the vacuumed vessel. The vacuum part can therefore be evacuated in a factory in advance and eliminates the need to fix the bushing to the coolant vessel and the vacuumed vessel in transportation. Accordingly, the cryogenic apparatus according to the present invention can relieve height limitation in transportation. In addition, the vacuum part can be evacuated without the bushing, the connection part, or a reinforced insulating layer, for example, in the coolant vessel. This allows baking at high temperature, contributing to reduced evacuation time. The present invention will be described in detail.

The cryogenic apparatus according to the present invention can be applied to a variety of superconducting equipment having a superconducting part formed of a superconducting material. Examples of such superconducting equipment include a superconducting cable, a superconducting transformer, a superconducting fault current limiter, and superconducting power storage equipment. An example of a superconducting cable has a superconducting part including a first superconducting layer and a second superconducting layer disposed coaxially around the first superconducting layer. In the case of a superconducting transformer, a superconducting fault current limiter, or superconducting power storage equipment, for example, it includes a superconducting coil or a superconducting current-limiting element formed of a superconducting material as a superconducting part.

Another example of a superconducting cable includes a cable core having a superconducting part and a thermally insulating tube accommodating the core. An example of the cable core includes, in sequence from the center thereof, a former, a first superconducting layer, an electrically insulating layer, a second superconducting layer, and a protective layer. The second superconducting layer is disposed around the electrically insulating layer to function as, for example, a superconducting shield layer or a return conductor. The superconducting cable may be a single-core cable, which includes a single core, or a multicore cable, which includes a plurality of cores. In addition, the superconducting cable may be a cable for direct-current power transmission or a cable for alternating-current power transmission. A known superconducting cable may of course be used.

The bushing is connected to the terminal of the superconducting part via the connection part. The bushing is a member for communicating power between the superconducting part on the low-temperature side and a conductor on the room-temperature side. The bushing is used for input or output of power, or both. Specifically, the bushing includes a conductive part capable of electrical connection to the superconducting part of the superconducting equipment and a solid-state insulating layer disposed around the conductive part. The conductive part of the bushing is preferably formed of a conductive material that exhibits low electrical resistance around the temperature at which the superconducting equipment is used (coolant temperature), for example, around the temperature of liquid nitrogen if it is used as the coolant. The conductive material used is, for example, a metal such as copper or aluminum (both have a specific resistance, $\rho$, of $2 \times 10^{-7}$ $\Omega \cdot$cm at 77 K). The solid-state insulating layer can be formed of a resin material with excellent electrical insulation, for example, an insulating rubber material such as ethylene-propylene rubber. In particular, fiber-reinforced plastic (FRP) is preferred for its high electrical insulation performance. One of the terminals of the bushing (terminal on the low-temperature side) is accommodated in the cryogenic apparatus described later while the other terminal of the bushing (terminal on the room-temperature side) is accommodated in a porcelain tube protruding from the cryogenic apparatus or is disposed outside at room temperature. The porcelain tube is filled with an insulation fluid such as an insulation liquid or insulation gas with high electrical insulation, for example, an insulation oil or $SF_6$ gas. A flange is disposed around an intermediate part of the bushing to fix the bushing to the cryogenic apparatus. The flange used is one that can be fixed to the cryogenic apparatus while maintaining a vacuum in the first vacuum part described later. The bushing and the terminal of the superconducting part can be electrically connected via the connection part. The connection part preferably has a shield structure. The bushing can also be connected via the connection part to a connection conductor connected to the superconducting part and formed of a normal conductor material such as copper.

The cryogenic apparatus accommodates the terminal of the bushing on the low-temperature side and the connection part. The cryogenic apparatus includes the coolant vessel, which is filled with the coolant for cooling the terminal and the connection part, and the vacuumed vessel, which is disposed so as to surround the coolant vessel. The coolant vessel includes, for example, a main body accommodating the terminal of the bushing on the low-temperature side and the connection part and a tubular part accommodating the bushing. The main body has such a size that it can accommodate the above parts. The tubular part has such a size that the bushing can be inserted therein. Although the tubular part can be constituted of a flat pipe, part of the tubular part is preferably constituted of a flexible bellows pipe because it can absorb thermal contraction of the coolant vessel when the coolant vessel is cooled with the coolant. The coolant for filling the coolant vessel is a liquid coolant or a coolant gas, or both. The coolant gas used is, for example, nitrogen gas or helium gas. The liquid coolant used is, for example, liquid nitrogen or liquid helium. If the coolant vessel is filled with both a liquid coolant and a coolant gas, these coolants may be of the same type or of different types. In addition, if the coolant vessel is filled with both a liquid coolant and a coolant gas, the coolant vessel preferably has a liquid coolant region filled with the liquid coolant on the low-temperature side and a coolant gas region filled with the coolant gas on the room-temperature side. The coolant vessel and the vacuumed vessel described later are preferably formed of a metal with high strength, such as stainless steel.

The cryogenic apparatus according to the present invention is configured so that the bushing can be inserted while maintaining a vacuum in a space surrounded by the outer surface of the coolant vessel and the inner surface of the vacuumed vessel after evacuation. Specifically, the cryogenic apparatus according to the present invention has the first vacuum part inside the vacuumed vessel, where the bushing can be inserted while maintaining a vacuum therein. Because the cryogenic apparatus according to the present invention includes the first vacuum part, the coolant vessel and the vacuumed vessel can be assembled in, for example, a factory in advance before the bushing and the superconducting part are connected at an installation site. To connect the bushing and the superconducting part in the coolant vessel, preferably, the coolant vessel and the vacuumed vessel have handhole parts that can be opened while maintaining a vacuum in the first vacuum part. Specifically, the coolant vessel, particularly the main body accommodating the connection part, includes a handhole part that can be opened and closed, and the vacuumed vessel includes a handhole part that is disposed at a position corresponding to the handhole part of the coolant vessel and that can be opened and closed. The space inside the vacuumed vessel is preferably divided so that a vacuum can be maintained in the first vacuum part irrespective of the opening and closing of the handhole parts. For example, a cylindrical division wall is disposed so as to couple the coolant vessel and the vacuumed vessel. The division wall is fixed to the coolant vessel and the vacuumed vessel such that one of openings of the division wall (on the vacuumed vessel side) is positioned outside an opening of the handhole part of the vacuumed vessel and that the other opening of the division wall (on the coolant vessel side) is positioned outside an opening of the handhole part of the coolant vessel. This structure prevents the vacuum in the first vacuum part from being broken when the openings of the handhole parts are opened.

Preferably, a space surrounded by the inner surface of the division wall, the outer surface of the handhole part of the vacuumed vessel, and the inner surface of the handhole part of the coolant vessel is defined as a second vacuum part. Even if the second vacuum part is evacuated before, for example, connection operation in the coolant vessel, the vacuum in the second vacuum part is broken when the handhole part of the vacuumed vessel is opened; however, a high vacuum formed in the first vacuum part by evacuation in, for example, a factory in advance can be nearly completely maintained, and only the second vacuum part is evacuated. In addition, the superconducting part and the bushing can be easily connected through the handhole parts at an installation site. The handhole parts can therefore eliminate the need to fix the bushing to the coolant vessel and the vacuumed vessel during transportation of the cryogenic apparatus according to the present invention, thus relieving height limitation.

The handhole part includes an opening disposed in the coolant vessel and a cover part that can be opened and closed and can hermetically seal the opening. The handhole part includes an opening disposed at a position of the vacuumed vessel corresponding to the handhole part of the coolant vessel, and a cover part that can be opened and closed and can hermetically seal the opening. The cylindrical division wall is fixed to the coolant vessel and the vacuumed vessel such that one of the openings of the division wall is positioned outside the opening of the coolant vessel and that the other opening of the division wall is positioned outside the opening of the vacuumed vessel. If the division wall is joined to the coolant vessel, the coolant cools the division wall and thus causes thermal contraction when charged into the coolant vessel. The division wall preferably has a mechanism capable of absorbing thermal contraction to prevent breakage of the coolant vessel and the vacuumed vessel due to thermal contraction. For example, at least part of the division wall can be constituted of a flexible member such as a bellows pipe.

The vacuumed vessel is disposed so as to surround the coolant vessel. As described above, the space inside the vacuumed vessel is not necessarily a single continuous space, but can be divided into independent spaces to define a plurality of vacuum parts. Specifically, the second vacuum part can be defined so as to surround the handhole parts in addition to the first vacuum part, where the components of the cryogenic apparatus do not include those of the bushing. With this structure, operations such as attachment of the bushing and setup of the connection part can be performed after the assembly and evacuation of the coolant vessel and the vacuumed vessel, thus reducing the time for evacuation at an installation site.

The vacuumed vessel may be simply evacuated to a predetermined degree of vacuum, or a thermally insulating layer for reflecting radiation heat may be formed using a thermal insulation such as Super Insulation (trade name) in evacuation. The evacuation and formation of the thermal insulation in the second vacuum part are preferably performed after the connection part is set up in the coolant vessel and the opening of the handhole part of the coolant vessel is closed with the cover part.

In addition, if the vacuumed vessel has a supporting structure capable of supporting the coolant vessel on the vacuumed vessel, the supporting structure can prevent breakage due to vibrations during, for example, transportation or installation. If the supporting structure used is, for example, a supporting member fixed so as to couple the vacuumed vessel and the coolant vessel, the supporting member can transfer heat to the coolant vessel. If the supporting member is fixed to the vacuumed vessel and the coolant vessel, therefore, the supporting member is preferably formed of a material with low thermal conductivity, for example, a resin such as FRP. Alternatively, a supporting structure that can couple the vacuumed vessel and the coolant vessel during transportation or installation and can be separated from the coolant vessel during use of superconducting equipment is more preferably used to prevent heat transfer to the coolant vessel side via the supporting structure. Such a supporting structure includes, for example, a shaft part that can be moved forward and backward through a wall part of the vacuumed vessel and a contact part that is connected to the shaft part and that can be moved into and out of contact with the coolant vessel as the shaft part is moved forward and backward. In this case, the vacuumed vessel preferably includes the third vacuum part, which is separated as a space different from the first and second vacuum parts, so that the vacuum in the first and second vacuum parts is not broken as the shaft part is moved. In the third vacuum part, the shaft part can move the contact part into and out of contact with the coolant vessel while maintaining a vacuum in the first and second vacuum parts. The third vacuum part can therefore prevent heat transfer to the coolant vessel side via the supporting structure. The third vacuum part may be a space surrounded by the coolant vessel, the vacuumed vessel, and the division wall coupling the coolant vessel and the vacuumed vessel, or may be a space inside a bottom-closed flexible container fixed to the vacuumed vessel. In the latter case, it is possible to insert the shaft part through the wall part of the vacuumed vessel into the container of the third vacuum part and fix the shaft part to a bottom part of the container, which serves as the contact part. Alternatively, it is possible to insert the shaft part through the bottom part, rather than to fix it to the bottom part, so that an end of the shaft part protrudes from the bottom part. In this case, a penetrating portion of the shaft part is hermetically fixed to the bottom part, and a contact part is added to the end of the shaft protruding from the bottom part. The flexible container is preferably deformed as the shaft part is moved. The movable contact part of the supporting structure can remain out of contact with the coolant vessel during use of superconducting equipment, as described above, or can be brought into contact with the coolant vessel to more stably hold the coolant vessel during use in case of, for example, an earthquake. In this case, heat transfer to the coolant vessel side via the supporting structure can be reduced if at least a surface of the contact part to be brought into contact with the coolant vessel is formed of a material with low thermal conductivity such as FRP. More preferably, both the contact part and the shaft part are formed of a material with low thermal conductivity. The third vacuum part can be evacuated either to a degree of vacuum similar to that of the first vacuum part or to a degree of vacuum less than that of the first vacuum part. In addition, the shaft part is preferably hermetically attached to the vacuumed vessel so that the vacuum in the third vacuum part is not broken but is maintained as the shaft part is moved.

The cryogenic apparatus according to the present invention having the structure described above is particularly suitable for use as a terminal connection box of a superconducting cable. That is, a termination structure of a superconducting cable according to the present invention includes a terminal of the superconducting cable disposed on a low-temperature side, a bushing for communicating power between the low-temperature side and a room-temperature side, a connection part connecting the terminal of the superconducting cable and the bushing, and a terminal connection box accommodating the connection part. The above cryogenic apparatus having the first vacuum part is used as the terminal connection box.

ADVANTAGES

The vacuumed vessel of the cryogenic apparatus according to the present invention includes the vacuum part where a vacuum can be maintained irrespective of the presence or absence of the bushing. The vacuumed vessel can therefore be evacuated to a high vacuum in, for example, a factory in advance. This contributes to improved workability at installation sites. In transportation, additionally, a vacuum can be maintained in the first vacuum part without fixing the bushing to the coolant vessel or the vacuumed vessel. The cryogenic apparatus according to the present invention can therefore be transported without the bushing attached thereto. This relieves transportation problems such as height limitation. In particular, if the coolant vessel and the vacuumed vessel have the handhole parts and the second vacuum part is isolated from the first vacuum part, the bushing and the superconducting part can be easily connected at an installation site through the second vacuum part while maintaining a vacuum in the first vacuum part.

Figure 1:
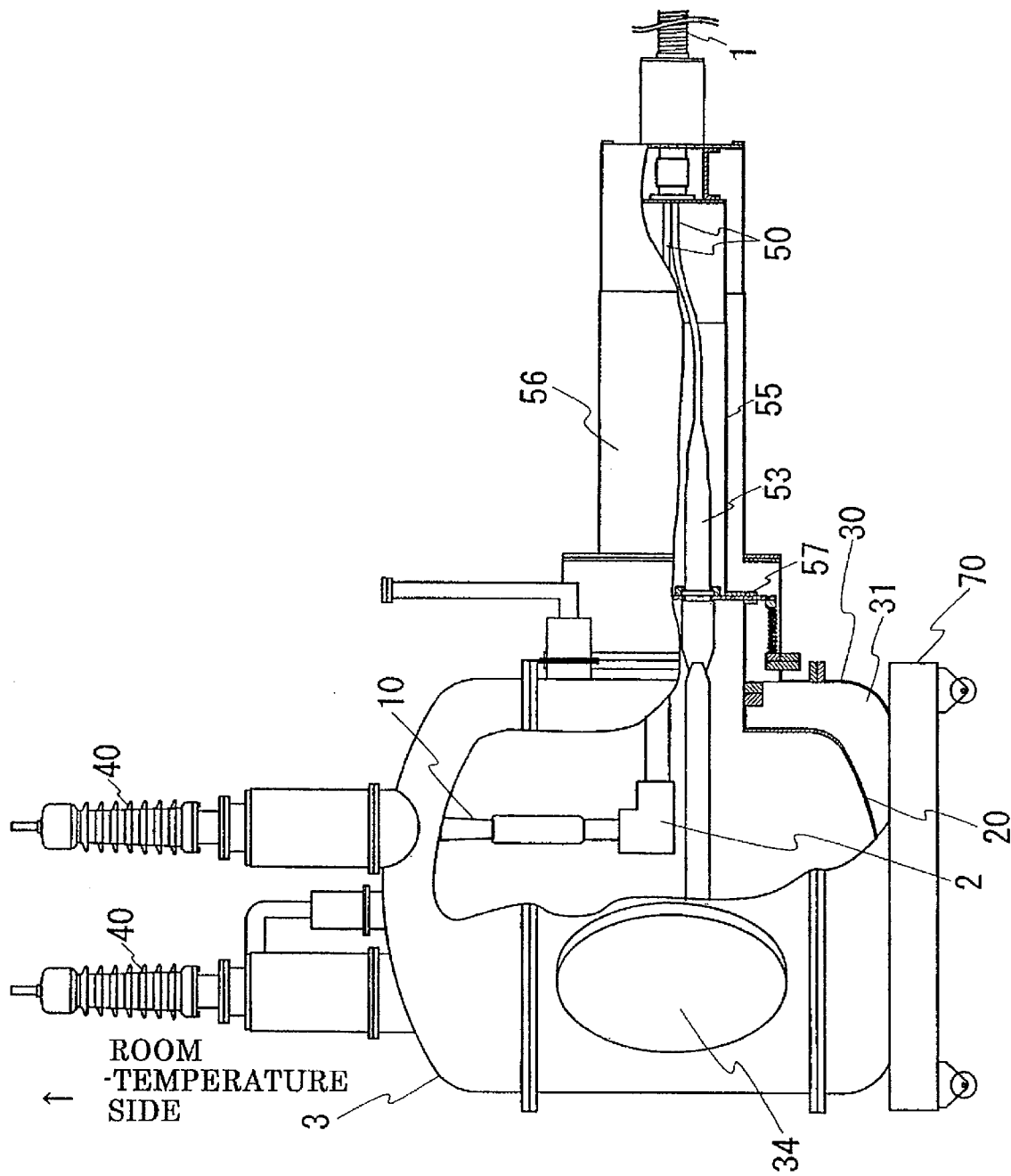
FIG. 1 is a schematic partial cutaway view of an entire termination structure of a superconducting cable according to the present invention.

REFERENCE NUMERALS 1 superconducting cable
2 connection part
3 terminal connection box (cryogenic apparatus)
10 bushing
11 conductive part
12 solid-state insulating layer
13 flange
14 upper shield
20 coolant vessel
21 main body
22 tubular part
23 flange
24 handhole part of coolant vessel
25 opening
26 cover part
30 vacuumed vessel
30a fixing part
30d, 30m, and 30u component of vacuumed vessel
31 first vacuum part 32 second vacuum part
33 third vacuum part
34 handhole part of vacuumed vessel
35 opening
36 cover part
38 division wall
38a bellows pipe
38b flat pipe
40 porcelain tube
50 cable core
51 superconductor
52 connection conductor
52a connecting sleeve
53 reinforced insulating layer
54 epoxy unit
54a flange
55 connection coolant vessel
56 connection vacuumed vessel
57 flange
60 and 67 supporting structure
61 contact part
62 shaft part
63 bellows pipe
64 bottom part
65 contact part
66 thermally insulating layer
70 vehicle
100 cable core
100a superconductor
101 bushing
101a conductive part
101b solid-state insulating layer
101c and 101d flange
102 coolant vessel
103 vacuumed vessel
103a intermediate vacuum part
103b outer vacuum part
104 porcelain tube
110 connection part
120 connection conductor

BEST MODE FOR CARRYING OUT THE
INVENTION

An embodiment of the present invention will now be described.

[Structure]

Figure 2:
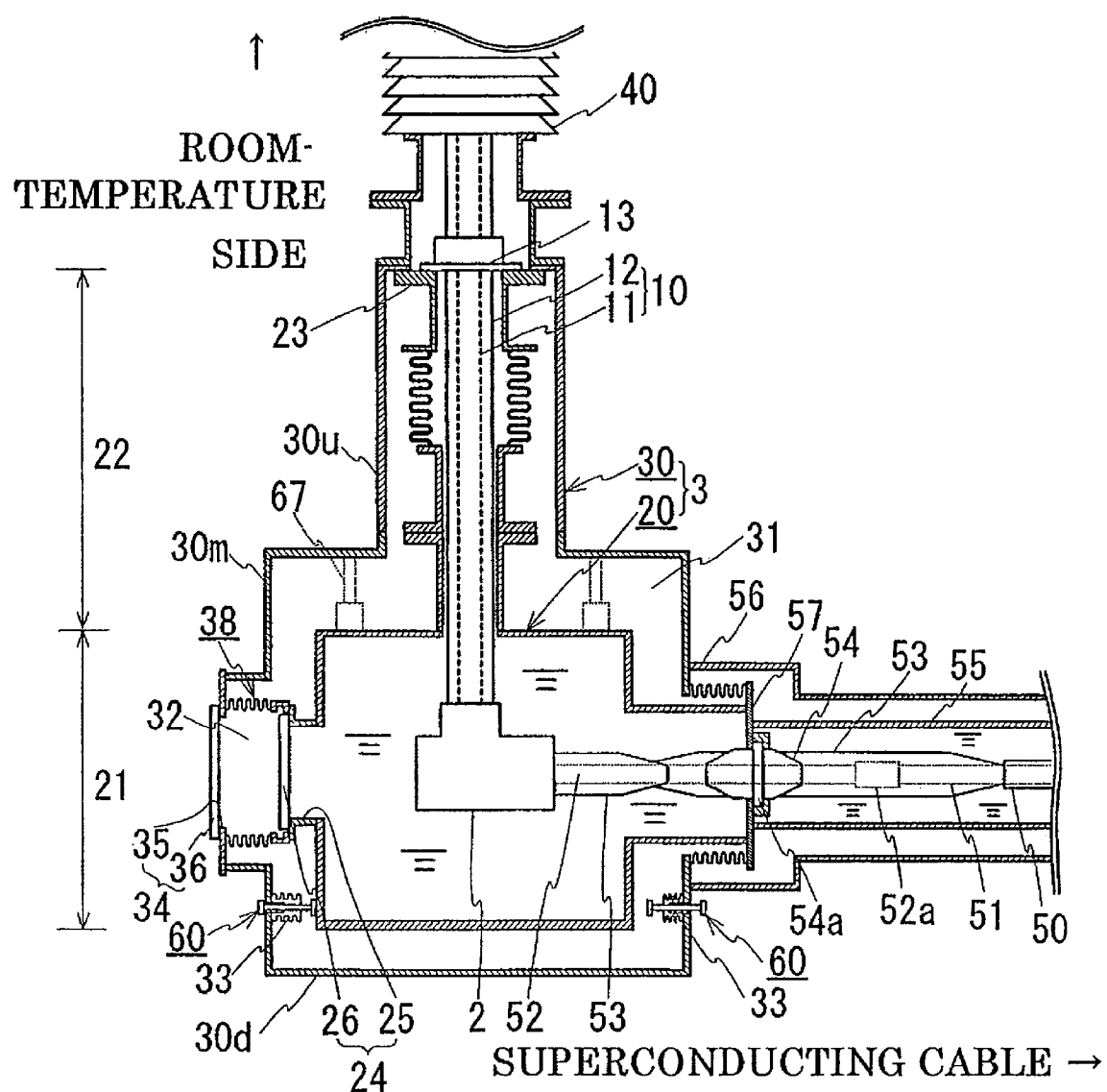
FIG. 2 is a schematic partial sectional view of a cable core and its vicinity in the termination structure of the superconducting cable according to the present invention.
Figure 3:
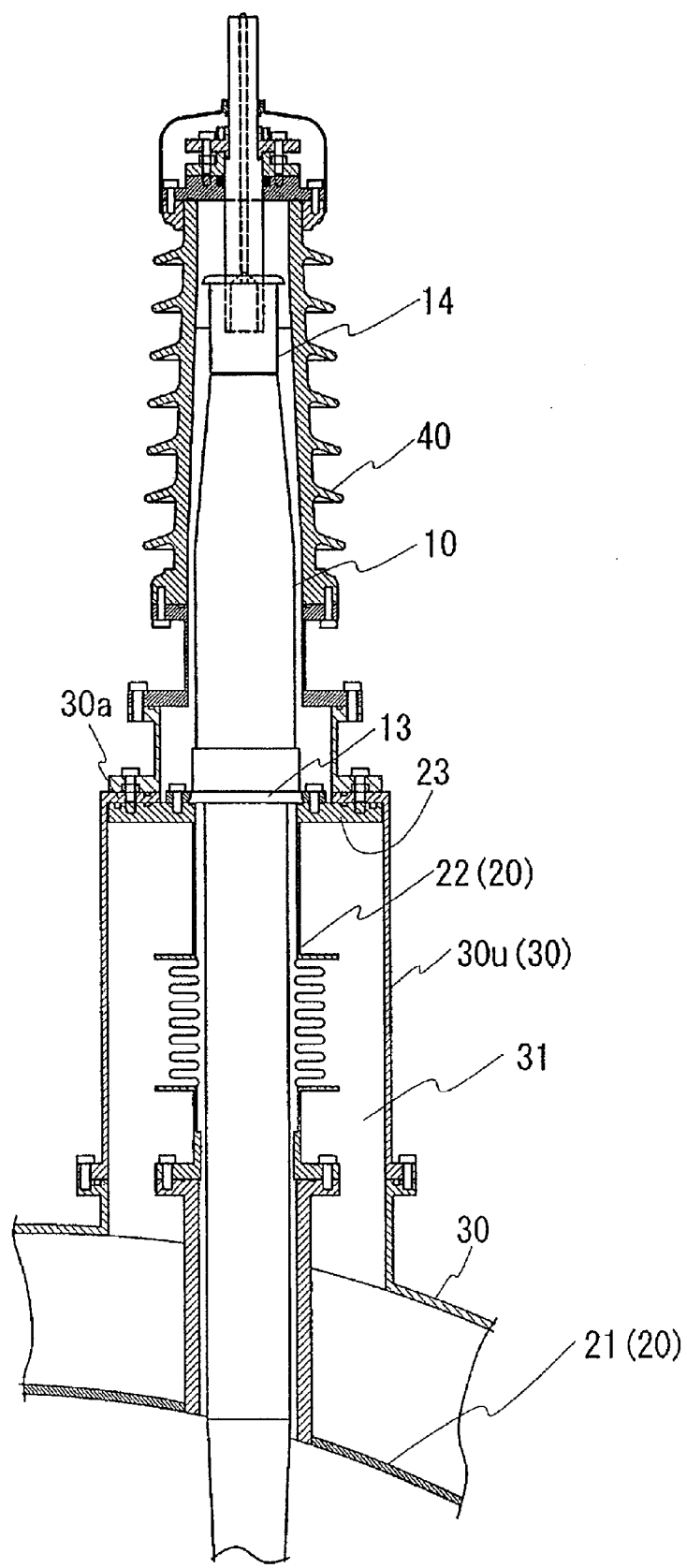
FIG. 3 is a schematic enlarged sectional view of a bushing part in the termination structure of the superconducting cable according to the present invention.

FIGS. 1 to 3 schematically illustrate a termination structure of a superconducting cable according to the present invention. FIG. 1 is a partial cutaway view of the entire termination structure. FIG. 2 is a partial sectional view of a cable core and its vicinity. FIG. 3 is an enlarged sectional view of a bushing part. This termination structure communicates power between a room-temperature side and a low-temperature side via bushings 10. A terminal of a superconducting cable 1 is disposed on the low-temperature side. Specifically, the termination structure includes the terminal of the superconducting cable 1, the bushings 10, which are connected to superconductors 51 of the cable 1 for providing electrical connection between the low-temperature side and the room-temperature side, connection parts 2 connecting the terminals of the cable 1 and the bushings 10, and a terminal connection box (cryogenic apparatus) 3 accommodating the connection parts 2. The terminal connection box 3 accommodates terminals of the bushing 10 (terminals on the low-temperature side) and the connection parts 2. The terminal connection box 3 includes a coolant vessel 20 filled with a coolant for cooling the terminals of the bushings 10 and the connection parts 2 and a vacuumed vessel 30 disposed so as to surround the coolant vessel 20. Porcelain tubes 40 protrude from the room-temperature side of the vacuumed vessel 30 and accommodate the other terminals of the bushings 10 (terminals on the room-temperature side). This termination structure is primarily characterized in that a space inside the vacuumed vessel 103 is divided into different parts, including a vacuum part (first vacuum part 31) where a vacuum can be maintained irrespective of the presence or absence of the bushings 10, a second vacuum part 32 described later, and third vacuum parts 33 described later. Each part will be described in detail.

The superconducting cable 1 used in this embodiment is a three-core cable including a strand of three cable cores 50 and accommodated in a thermally insulating tube. Each of the cores 50 includes, in sequence from the center thereof, a former, the superconductor (first superconducting layer) 51, an electrically insulating layer, a second superconducting layer, and a protective layer. The thermally insulating tube has a double structure including an inner pipe filled with a coolant (liquid nitrogen in this embodiment) and an outer pipe disposed therearound. A space between the inner and outer pipes is evacuated to a predetermined degree of vacuum. The superconductor 51 is exposed by stripping a terminal of the core 50 and is connected to a copper connection conductor 52 via a connecting sleeve 52a. The connection conductor 52 is introduced into the coolant vessel 20. A reinforced insulating layer 53 covers the exposed superconductor 51, the connecting sleeve 52a, and the connection conductor 52. An epoxy unit 54 is disposed around part of the connection conductor 52. The epoxy unit 54 has a flange 54a fixed to the coolant vessel 20 to hold the superconductor 51 in place. The terminal of the core 50, part of the auxiliary insulating layer 53, and part of the epoxy unit 54 are accommodated in a connection coolant vessel 55 filled with a coolant (liquid nitrogen in this embodiment). A connection vacuumed vessel 56 is disposed so as to surround the connection coolant vessel 55. A space between the connection coolant vessel 55 and the connection vacuumed vessel 56 is filled with thermal insulation and is evacuated to a predetermined degree of vacuum to form a thermally insulating layer. Although only one core is illustrated in FIG. 2, the other two cores are similarly connected and accommodated in the connection coolant vessel 55 and the connection vacuumed vessel 56, as shown in FIG. 1, and the corresponding connection parts 2 are accommodated in the coolant vessel 20.

Each of the bushings 10 used in this embodiment includes a conductive part 11 capable of electrical connection to the superconductor 51 and a solid-state insulating layer 12 covering the conductive part 11. The conductive part 11 of the bushing 10 is connected to the superconductor 51 via the connection part 2 (and the connection conductor 52 in this embodiment). The conductive part 11 is formed of copper, which exhibits low electrical resistance around the temperature of liquid nitrogen. The solid-state insulating layer 12 is formed of FRP, which has excellent electrical insulation. A flange 13 is disposed around the periphery of an intermediate part of the bushing 10 to fix the bushing 10 to the coolant vessel 20. One of the surfaces of the flange 13 is disposed on the coolant vessel side while the other surface is disposed on the porcelain tube 40 side, and the flange 13 is not disposed in the vacuumed vessel 30. In this structure, the flange 13 functions as a sealing member for sealing the room-temperature side of the coolant vessel 20 and also as a boundary between the coolant vessel 20 on the low-temperature side and the porcelain tube 40 on the room-temperature side. The connection part 2 connecting the superconductor 51 and the bushing 10 has a shield structure (not shown), and the terminal of the bushing 10 on the room-temperature side has a copper upper shield 14 (see FIG. 3).

In this embodiment, the coolant vessel 20 includes a main body 21 and tubular parts 22 (both are formed of stainless steel). The main body 21 accommodates the terminals of the bushings 10 on the low-temperature side, the connection parts 2, and part of the connection conductors 52. The tubular parts 22 have the bushings 10 inserted therein. The main body 21 is a container having such a size that it can accommodate the terminals of the bushings 10 on the low-temperature side, the connection parts 2, and part of the connection conductors 52 and is filled with liquid nitrogen. The main body 21 is connected to a refrigerator (not shown) for cooling the liquid nitrogen and to piping (not shown) for supplying and discharging the liquid nitrogen in circulating cooling. The tubular parts 22 are cylindrical and have such a size that the bushings 10 can be inserted therein. The low-temperature side of each tubular part 22 is constituted of a flat pipe, and part of the room-temperature side of the tubular part 22 is constituted of a bellows pipe. The tubular part 22 is filled with liquid nitrogen on the low-temperature side thereof (flat pipe) and with nitrogen gas on the room-temperature side thereof (part of the flat pipe, the bellows pipe, and a part upper than the bellows pipe). The size of the tubular part 22 is adjusted so that the boundary between the liquid coolant and the coolant gas is positioned in a space inside the flat pipe without using, for example, a pressurizing device. If part of the tubular part 22 is constituted of a bellows pipe, it can absorb thermal contraction of the coolant vessel 20 through deformation when the coolant vessel 20 is filled with the coolants and is cooled thereby. In this embodiment, additionally, the bellows pipe is readily deformed because the pipe is filled with nitrogen gas. Furthermore, a sufficient temperature gradient can be formed between the low-temperature side and the room-temperature side by filling the tubular part 22 with both the liquid coolant and the coolant gas. Another flange 23 is disposed at the terminal of the tubular part 22 on the room-temperature side to fix the flange 13 of the bushing 10. The flange 23 is also used as a fixing member for fixing the tubular part 22 to the vacuumed vessel 30 described later.

A flange 57 having a hole for insertion of the epoxy unit 54 is disposed at a position of the main body 21 where the connection conductor 52 is introduced. That is, the epoxy unit 54 and the flange 57 function as a sealing member for sealing the low-temperature side of the coolant vessel 20. The flange 57 also functions as a sealing member for sealing the vacuumed vessel 30.

In this embodiment, the main body 21 further includes a handhole part of the coolant vessel 24. FIG. 4(A) is a partial enlarged sectional view of the handhole part, and FIG. 4(B) is a partial enlarged sectional view of a supporting structure. The handhole part 24 includes an opening 25 in the main body 21 of the coolant vessel 20 and a cover part 26 that can be opened and closed and can hermetically seal the opening 25. That is, the coolant vessel 20 can be opened and closed by opening and closing the cover part 26 after the flange 13 of the bushing 10 (see FIG. 3) is fixed to the flange 23 (see FIG. 3) and the epoxy unit 54 and the flange 57 (see FIG. 2) are fixed to the opening of the coolant vessel 20 on the low-temperature side.

The vacuumed vessel 30 has a handhole part of the vacuumed vessel 34 at a position corresponding to the handhole part of the coolant vessel 24. The handhole part 34 includes an opening 35 in the vacuumed vessel 30 and a cover part 36 that can be opened and closed and can hermetically seal the opening 35. The handhole part 34 is configured so that the cover part 36 can be opened while maintaining a vacuum in most of the vacuumed vessel 30 (the first vacuum part 31 described later). Specifically, a cylindrical division wall 38 is disposed so as to couple the handhole part 24 of the coolant vessel 20 and the handhole part 34 of the vacuumed vessel 30. The division wall 38 separates a space outside the division wall 38 and a space inside the division wall 38. Specifically, the division wall 38 is fixed to an outer surface of the coolant vessel 20 and to an inner surface of the vacuumed vessel 30 such that one of openings of the division wall 38 (on the coolant vessel side) is positioned outside (around the periphery of) the opening 25 of the coolant vessel 20 and that the other opening of the division wall 38 (on the vacuumed vessel side) is positioned outside (around the periphery of) the opening 35 of the vacuumed vessel 30. In this structure, the cover parts 26 and 36 can be opened and closed while maintaining a vacuum in the first vacuum part 31. In this embodiment, the division wall 38 includes a flexible bellows pipe 38$a$ and a flat pipe 38$b$ connected in series. An end of the bellows pipe 38$a$ is fixed to the inner surface of the vacuumed vessel 30 while an end of the flat pipe is fixed to the outer surface of the coolant vessel 20. The bellows pipe 38$a$ can absorb thermal contraction of the coolant vessel 20 through deformation when the coolant vessel 20 is cooled with the coolants.

The vacuumed vessel 30 is disposed so as to surround the coolant vessel 20. The space inside the vacuumed vessel 30 is not a single continuous space, but is divided into different spaces. Referring to FIG. 2, specifically, the space inside the vacuumed vessel 30 is divided into the first vacuum part 31, the second vacuum part 32, and the third vacuum parts 33.

The first vacuum part 31 is a space defined around the bushings 10 and below the coolant vessel 20 and occupying most of the space inside the vacuumed vessel 30. Specifically, the first vacuum part 31 is a space surrounded by the inner surface of the flange 23 of the coolant vessel 20, the outer surface of the tubular part 22, the outer surface of the main body 21, the outer surface of the division wall 38 (see FIG. 4), and the inner surface of the vacuumed vessel 30. That is, the components of the first vacuum part 31 do not include the components of the bushings 10. This structure can maintain a vacuum in the first vacuum part 31 irrespective of the presence or absence of the bushings 10.

Figure 4:
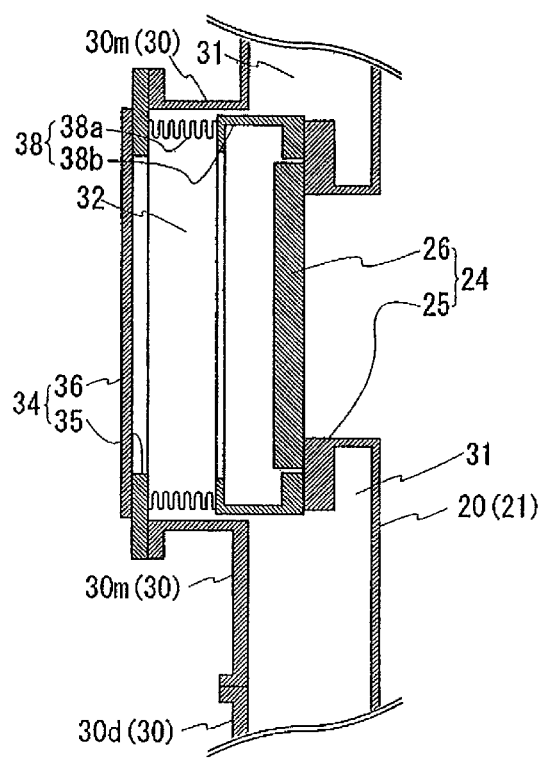
FIG. 4(A) is a schematic partial sectional view of handhole parts and their vicinity in the termination structure of the superconducting cable according to the present invention.
FIG. 4(B) is a schematic partial sectional view of a supporting structure having a mechanism capable of being moved into and out of contact with a coolant vessel.
FIG. 4(C) is a schematic partial sectional view of a supporting structure having a contact part on a coolant vessel.
Figure 4:
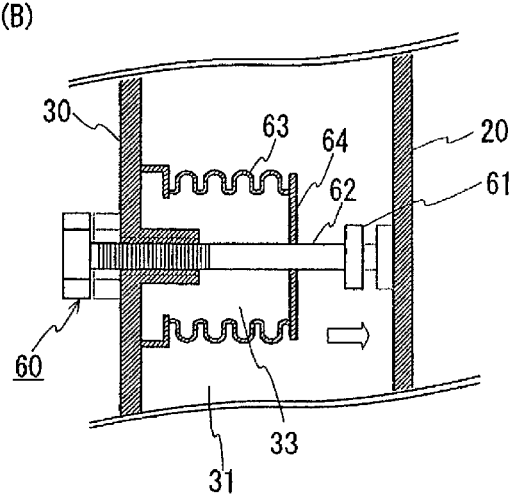
Figure 4:
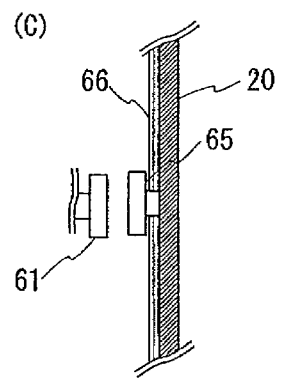
Figure 5:
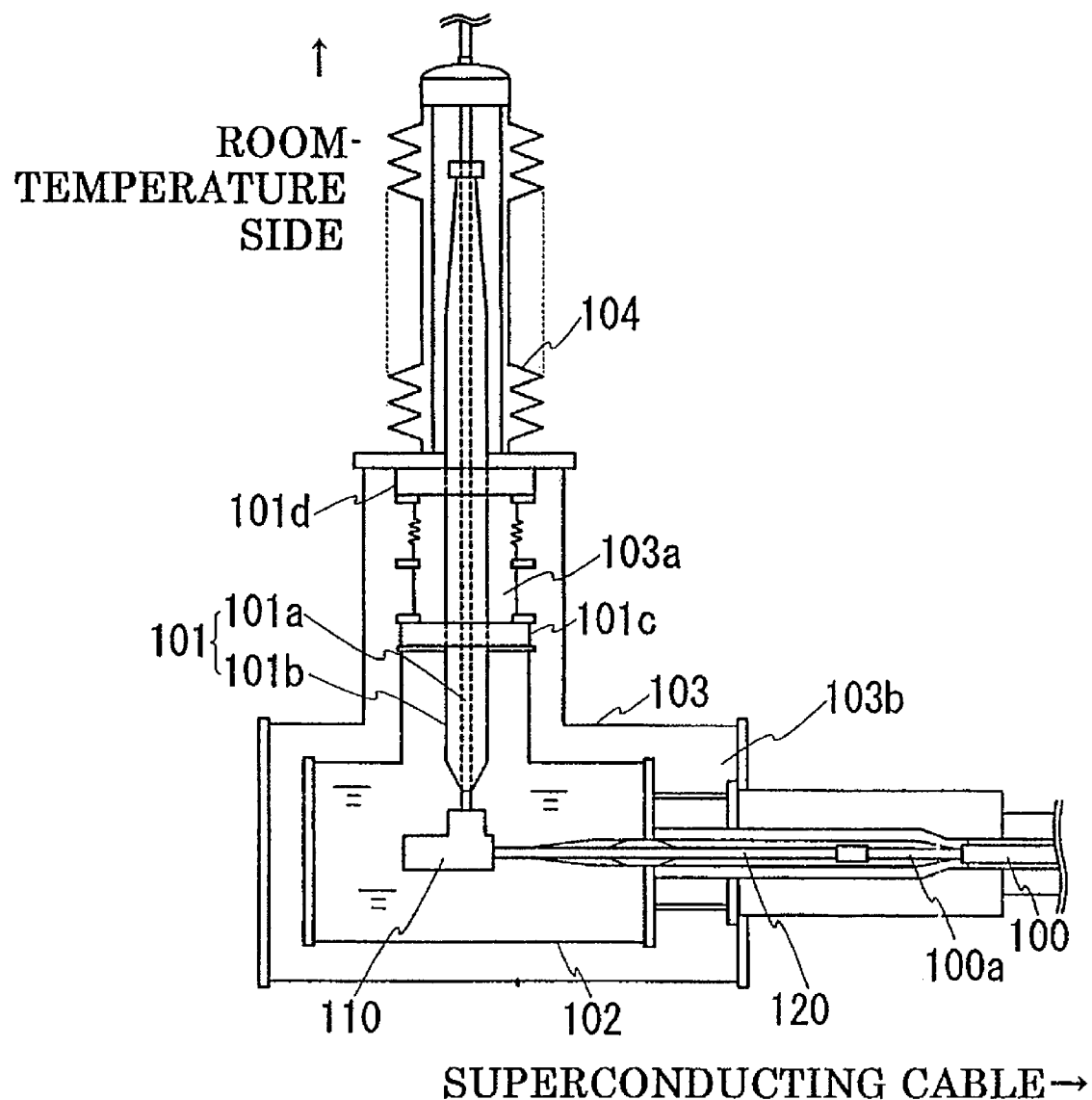
FIG. 5 is a schematic diagram of a known termination structure of a superconducting cable.

Referring to FIG. 4, the second vacuum part 32 is a space defined in the vicinity of the handhole parts 24 and 34, which are used in, for example, setup of the connection parts 2. The second vacuum part 32 allows the opening and closing of the coolant vessel 20 while maintaining a vacuum in the first vacuum part 31. Specifically, the second vacuum part 32 is a space surrounded by the outer surface of the cover part 26 of the coolant vessel 20, the inner surface of the division wall 38, and the inner surface of the cover part 36 of the vacuumed vessel 30. Because the second vacuum part 32 has a space independent of the vacuum part 31, the vacuum in the first vacuum part 31 can be maintained irrespective of the opening and closing of the cover parts 26 and 36.

The termination structure according to this embodiment includes supporting structures 60 for suppressing vibration of the coolant vessel 20 inside the vacuumed vessel 30 during, for example, transportation to prevent breakage of the coolant vessel 20 and coolant-vessel supporting structures 67 (described later). Referring to FIG. 4(B), each of the supporting structures 60 includes a contact part 61 that can be brought into contact with the main body 21 of the coolant vessel 20 and a shaft part 62 that can move the contact part 61 into and out of contact with the coolant vessel 20. A screw formed in part of the periphery of the shaft part 62 is engaged with the vacuumed vessel 30. The vacuumed vessel 30 has a screw hole into which the screw formed on the shaft part 62 is engaged. As the screw is tightened or loosened, the shaft part 62 is moved forward or backward to move the contact part 61 into or out of contact with the coolant vessel 20. The movement of the contact part 61 can then break the vacuum in the first vacuum part through the screw hole of the vacuumed vessel 30. In this embodiment, the third vacuum part 33 is defined by fixing a bottom-closed bellows pipe 63 to a position of the inner surface of the vacuumed vessel 30 where the shaft part 62 is inserted. The third vacuum part 33 is surrounded by the inner surface of the bellows pipe 63, the inner surface of a bottom part 64, and the inner surface of the vacuumed vessel 30. The third vacuum part 33 has a space different from that of the first vacuum part 31. An end of the shaft part 62 protrudes from the bottom part 64 of the bellows pipe 63, and the contact part 61 is disposed at the end of the shaft part 62. The end of the screw formed on the shaft part 62 is engaged into the screw hole of the vacuumed vessel 30, and an intermediate portion of the shaft part 62 is inserted into the bellows pipe 63 through the vacuumed vessel 30. The other end of the shaft part 62 penetrates through the bottom part 64 of the bellows pipe 63, and a penetrating portion of the shaft part 62 is hermetically fixed to the bottom part 64. The contact part 61 is disposed at the end of the shaft part 62 protruding from the bottom part 64. Therefore, the contact part 61 is disposed in the first vacuum part 31. As the shaft part 62 is moved forward or backward, it deforms the bellows pipe 63 and moves the contact part 61 into or out of contact with the coolant vessel 20. The third vacuum part 33 thus allows the movement of the contact part 61 while maintaining a vacuum in the first vacuum part 31 and the second vacuum part 32. The third vacuum part 33 is preferably evacuated so as to maintain a vacuum therein irrespective of the movement of the contact part 61. If thermal insulation is disposed around the coolant vessel 20, the contact part 61 can break the layer of thermal insulation when brought into contact with the coolant vessel 20. Referring to FIG. 4(C), a thermal insulation layer 66 can be disposed on a portion of the coolant vessel 20 other than a contact part 65 provided for contact with the contact part 61. The supporting structure 60 and the contact part 65 are preferably formed of a material with excellent strength and low thermal conductivity such as FRP.

[Assembly Process]

Next, a process of assembling the termination structure will be described, where the terminal connection box 3 is assembled in, for example, a factory. First, the coolant vessel 20 is assembled. Specifically, the components of the tubular parts 22 of the coolant vessel 20 are attached to the components of the main body 21. The cover part 26 is then fixed to the opening 25 of the handhole part 24. Accordingly, the coolant vessel 20 is assembled with the room-temperature side thereof opened, where the bushings 10 are to be inserted, and with the low-temperature side thereof opened, where the connection conductors 52 and the epoxy units are to be inserted. Fastening members such as bolts may be optionally used for attachment; this also applies to the subsequent process.

After the coolant vessel 20 is assembled, thermal insulation is provided around the coolant vessel 20 if necessary. The vacuumed vessel 30 is then assembled so as to surround the coolant vessel 20. Specifically, the division wall 38 is attached to the outside of the opening 25 of the handhole part 24 disposed in the coolant vessel 20. A component 30d of the vacuumed vessel 30 is attached so as to cover the bottom of the main body 21 of the coolant vessel 20, and another component 30m of the vacuumed vessel 30 is attached so as to cover the top of the main body 21. A bellows pipe is connected to the vacuumed vessel 30 so as to surround a part of the circumference of the coolant vessel 20 on the superconducting cable side (to the right in FIG. 2). The flange 57 is fixed to an opening of the bellows pipe to seal the low-temperature side of the vacuumed vessel 30, where the superconducting cable 1 is to be connected. The bellows pipe connected to the vacuumed vessel 30 can absorb thermal contraction of the coolant vessel 20 through deformation when the coolant vessel 20 is filled with coolants, thus preventing problems such as breakage of the coolant vessel 20. As shown in FIG. 4(A), the component 30m of the vacuumed vessel 30 is fixed to the division wall 38 such that part of the component 30m surrounds the division wall 38 and that the opening 35 of the component 30m is positioned within the opening of the division wall 38. The cover part 36 is fixed to the opening 35 to form the space functioning as the second vacuum part 32.

Components 30u are attached to the top of the component 30m (on the room-temperature side) so as to cover the peripheries of the tubular parts 22 of the coolant vessel 20. Fixing parts 30a for fixing the flanges 23 of the coolant vessel 20 are attached to ends of the components 30u on the room-temperature side. The fixing parts 30a attached to the flanges 23 seal the room-temperature side of the vacuumed vessel 30 to form the space functioning as the first vacuum part 31. Sealing members are preferably provided between the fixing parts and the flanges 23 to hermetically seal the first vacuum part 31.

If the supporting structures 60 are provided, the shaft parts 62 are inserted through the bottom parts 64 of the bottom-closed bellows pipes 63 and are hermetically fixed thereto and the openings of the bellows pipes 63 are fixed to the component 30d by, for example, welding, thus forming the spaces functioning as the third vacuum parts 33. Screw parts are formed at positions of the component 30d where the shaft parts 62 are inserted. In addition to the supporting structures 60, the coolant vessel supporting structures 67 may be provided. The supporting structures 67, which support the coolant vessel 20 by suspending it from the vacuumed vessel 30, as shown in FIG. 2, differ from the supporting structures 60 in that the coolant vessel 20 and the vacuumed vessel 30 are constantly coupled. Accordingly, the supporting structures 67 are preferably formed of a material with low thermal conductivity such as FRP.

After the vacuumed vessel 30 is assembled, the first vacuum part 31, the second vacuum part 32, and the third vacuum parts 33 of the vacuumed vessel 30 are evacuated to a predetermined degree of vacuum. In particular, at least the first vacuum part 31 is evacuated to a high vacuum. Because the coolant vessel 20 does not accommodate, for example, a superconducting cable at this time, the time for evacuation can be reduced by baking at high temperature. The second vacuum part 32, where a vacuum is broken when the handhole parts 24 and 35 are opened, may be evacuated to a rather low vacuum. Also, the third vacuum parts 33 may be evacuated to a rather low vacuum if the first vacuum part 31 is evacuated to a high vacuum, because the first vacuum part 31 occupies most of the vacuum insulating layer in this structure. The terminal connection box 3 is transported to, for example, an installation site with at least the first vacuum part 31 evacuated.

During the transportation of the terminal connection box 3 according to this embodiment, the supporting structures 60 and 67 can prevent problems such as breakage of the coolant vessel 20 due to vibrations involved in the transportation. In addition, the terminal connection box 3 can eliminate the need to fix the bushings 10 to the coolant vessel 20 and the vacuumed vessel 30 during the transportation because a vacuum can be maintained in the first vacuum part 31 without fixing the bushings 10. This relieves transportation limitations such as height limitation.

The bushings 10 are inserted into the openings of the coolant vessel 20 on the room-temperature side in the terminal connection box 3 transported to, for example, an installation site. The flanges 13 are then attached to the bushings 10 and are fixed to the flanges 23 of the coolant vessel 20. Sealing members, for example, are preferably provided between the flanges 13 and 20 to hermetically seal the coolant vessel 20 and the porcelain tubes 40. On the other hand, the superconductors 51 are exposed by stripping the terminals of the superconducting cable and are connected to the connection conductors 52 with the connection sleeves 52a. The epoxy units 54 are then provided around the connection conductors 52 and are fixed to the flange 57 with the connection conductors 52 inserted in the insertion holes of the flange 57. Subsequently, the handhole parts 34 and 24 are opened for operations such as connecting the connection conductors 52 to the bushings 10 and forming the reinforced insulating layers 53. After such operations, the openings 25 and 35 are closed with the cover part 26 of the handhole part of the coolant vessel 24 and the cover part 36 of the handhole part of the vacuumed vessel 34, respectively, and the second vacuum part 32 is evacuated.

Unlike the known art, the coolant vessel 20 and the vacuumed vessel 30 are not constructed after the operations such as connection operation, but the terminal connection box 3 can be constructed in advance before the operations such as connection operation. In addition, the operations such as connection operation can be performed while maintaining a vacuum in the first vacuum part 31 before only the second vacuum part 32 is evacuated. This reduces the workload of evacuation operation at an installation site.

The reinforced insulating layers 53 are also formed around the superconductors 51 and the connection sleeves 52a. The connection coolant vessel 55 is fixed to the flange 57, and the connection vacuumed vessel 56 is fixed to the vacuumed vessel 30 so as to surround the connection coolant vessel 55 and is evacuated to a predetermined degree of vacuum. The porcelain tubes 40 are attached to the room-temperature side of the bushings 10. The coolant vessel 20 is filled with liquid nitrogen and nitrogen gas. The connection coolant vessel 55 is filled with liquid nitrogen. The porcelain tubes 40 are filled with $SF_6$ or an insulation oil. Thus, the termination structure of the superconducting cable is completed.

If the supporting structures 60 are provided, the contact parts 61 are preferably separated from the coolant vessel 20 by loosening the shaft parts 62 after the installation of the terminal connection box 3 at a predetermined position. Alternatively, the terminal connection box 3 can be mounted on, for example, a vehicle 70 as shown in FIG. 1 so that the box 3 can be moved with thermal contraction of the superconducting cable 1.

Although the cryogenic apparatus according to the present invention is used as a terminal connection box of a superconducting cable in the embodiment described above, the cryogenic apparatus can also be used as a container for accommodating a superconducting part of a superconducting transformer, a superconducting fault current limiter, or superconducting power storage equipment.

INDUSTRIAL APPLICABILITY

The cryogenic apparatus according to the present invention is suitable for accommodation of connection components for connecting the low-temperature and room-temperature sides of superconducting equipment. In particular, the cryogenic apparatus according to the present invention is suitable as a terminal connection box of a superconducting cable. In addition, the termination structure of a superconducting cable according to the present invention is suitable for use as a terminal part of a superconducting cable. The termination structure can be used for both direct-current power transmission and alternating-current power transmission.

The invention claimed is:

1. A cryogenic apparatus of superconducting equipment for accommodating a connection part connecting a terminal of a superconducting part disposed on a low-temperature side and a bushing connected to the superconducting part for communicating power between the low-temperature side and a room-temperature side, the cryogenic apparatus comprising:
   a coolant vessel accommodating a terminal of the bushing on the low-temperature side and the connection part and filled with a coolant for cooling the terminal and the connection part; and
   a vacuumed vessel disposed so as to surround the coolant vessel;
   wherein the vacuumed vessel includes a first vacuum part where a vacuum can be maintained within the first vacuum part in a state in which the bushing is completely removed from the coolant vessel.

2. The cryogenic apparatus of superconducting equipment according to claim 1, wherein
   the coolant vessel includes a handhole part that can be opened and closed;
   the vacuumed vessel includes a handhole part that is disposed at a position corresponding to the handhole part of the coolant vessel and that can be opened and closed; and
   the vacuumed vessel further includes a second vacuum part surrounded by the two handhole parts and a division wall coupling the handhole parts.

3. The cryogenic apparatus of superconducting equipment according to claim 2, wherein the division wall has a contraction-absorbing mechanism for absorbing thermal contraction of the coolant vessel due to the coolant.

4. The cryogenic apparatus of superconducting equipment according to claim 1 or 2, wherein
   the vacuumed vessel has a supporting structure capable of supporting the coolant vessel;
   the supporting structure includes a shaft part extending from the outside to the inside of the vacuumed vessel and a contact part that is connected to the shaft part and that can be moved into and out of contact with the coolant vessel as the shaft part is moved; and
   the vacuumed vessel includes a third vacuum part where a vacuum can be maintained irrespective of the movement of the shaft part.

5. The cryogenic apparatus of superconducting equipment according to any of claims 1 to 3, wherein the superconducting equipment is a superconducting cable, a superconducting transformer, a superconducting fault current limiter, or superconducting power storage equipment.

6. A termination structure of a superconducting cable, comprising:
   the terminal of the superconducting cable disposed on a low-temperature side;
   the bushing for communicating power between the low-temperature side and a room-temperature side;

the connection part connecting the terminal of the superconducting cable and the bushing; and a terminal connection box accommodating the connection part;

wherein the terminal connection box is the cryogenic apparatus according to any of claims 1 to 3.

7. The termination structure of the superconducting cable according to claim 6, wherein the superconducting cable is a single-core cable or a multicore cable.

8. The termination structure of the superconducting cable according to claim 6, wherein the superconducting cable is a cable for direct-current power transmission or a cable for alternating-current power transmission.

9. The termination structure of the superconducting cable according to claim 7, wherein the superconducting cable is a cable for direct-current power transmission or a cable for alternating-current power transmission.

10. The cryogenic apparatus of superconducting equipment according to claim 4, wherein the superconducting equipment is a superconducting cable, a superconducting transformer, a superconducting fault current limiter, or superconducting power storage equipment.

11. A termination structure of a superconducting cable, comprising:

the terminal of the superconducting cable disposed on a low-temperature side;

the bushing for communicating power between the low-temperature side and a room-temperature side;

the connection part connecting the terminal of the superconducting cable and the bushing; and a terminal connection box accommodating the connection part, wherein the terminal connection box is the cryogenic apparatus according to claim 4.

12. The termination structure of the superconducting cable according to claim 11, wherein the superconducting cable is a single-core cable or a multicore cable.

13. The termination structure of the superconducting cable according to claim 11, wherein the superconducting cable is a cable for direct-current power transmission or a cable for alternating-current power transmission.

14. The termination structure of the superconducting cable according to claim 12, wherein the superconducting cable is a cable for direct-current power transmission or a cable for alternating-current power transmission.

* * * * *